Sept. 2, 1969  D. J. NEALE, SR  3,464,660
TAPE SPLICING AND ANCHORING APPARATUS
Filed April 10, 1967  2 Sheets-Sheet 1
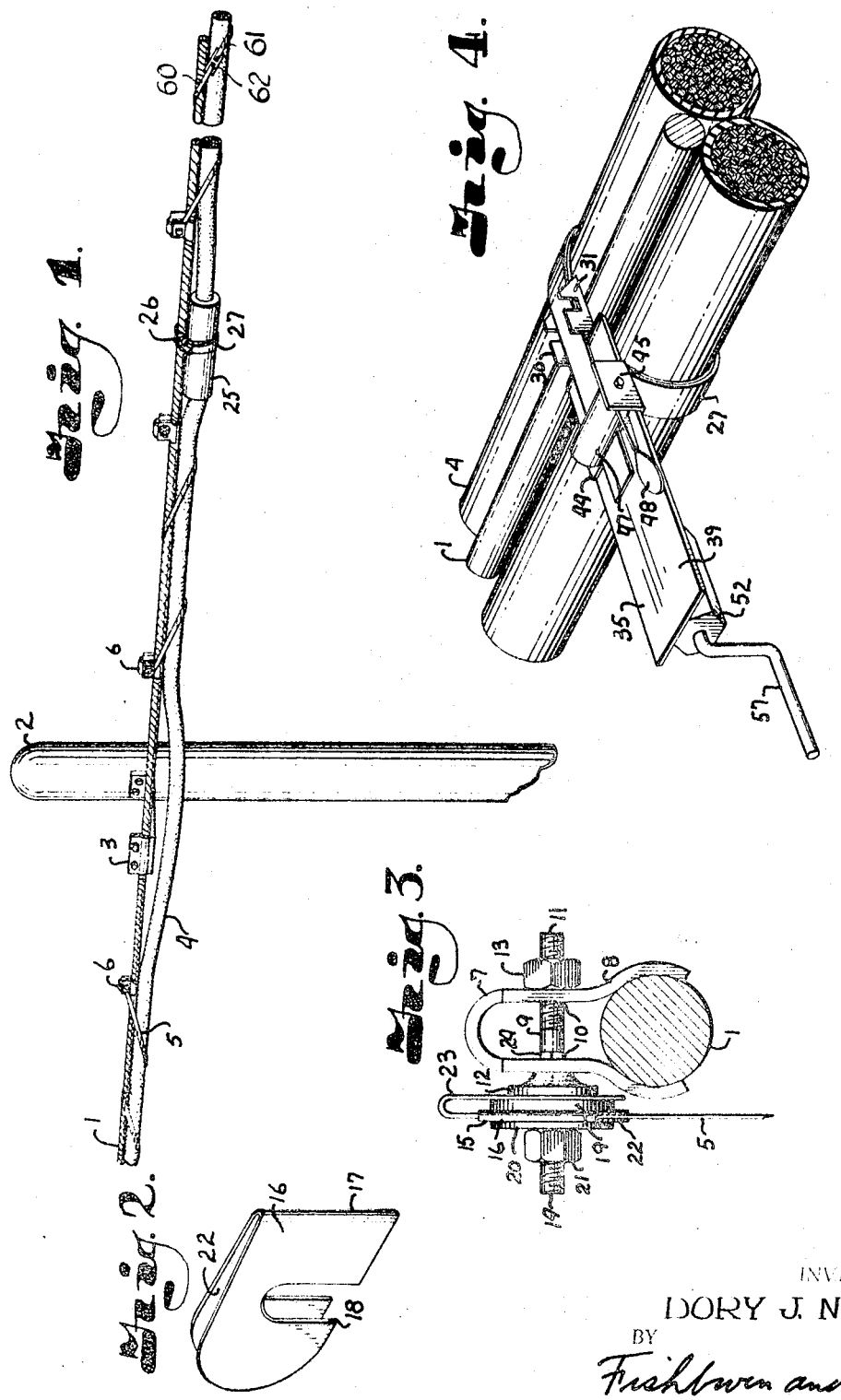
INVENTOR.
DORY J. NEALE, SR.
BY
Fishbwen and Gold
ATTORNEYS Sept. 2, 1969 D. J. NEALE, SR 3,464,660
TAPE SPLICING AND ANCHORING APPARATUS
Filed April 10, 1967 2 Sheets-Sheet 2
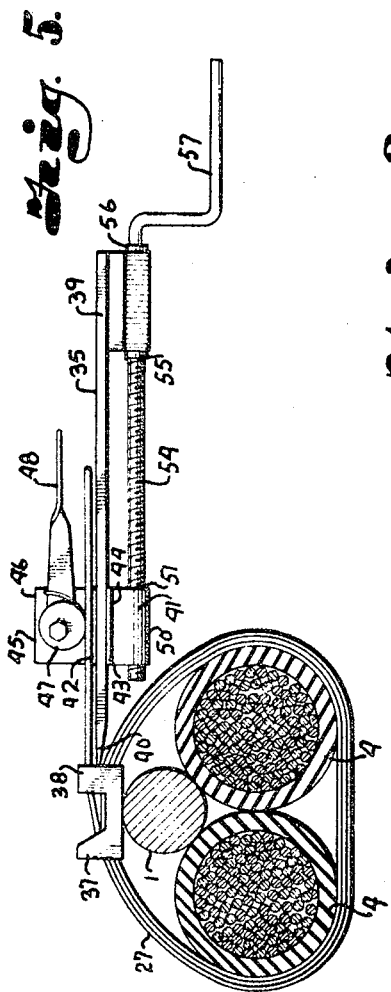
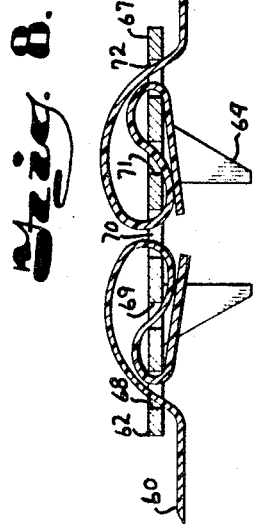
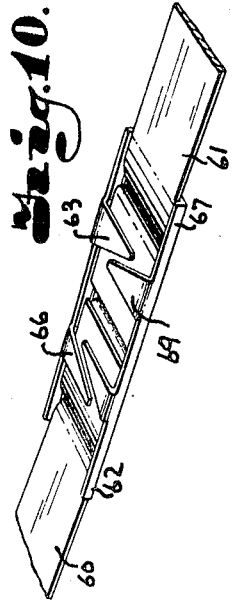
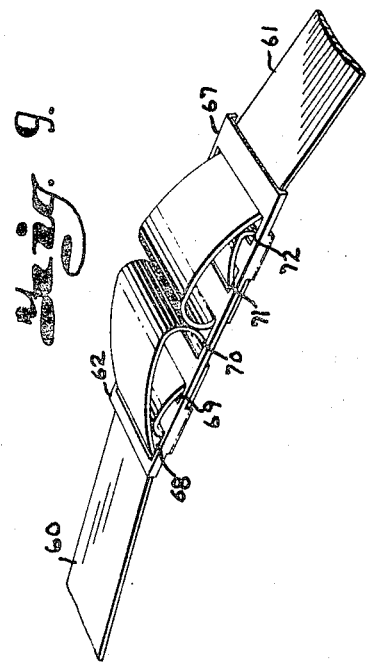
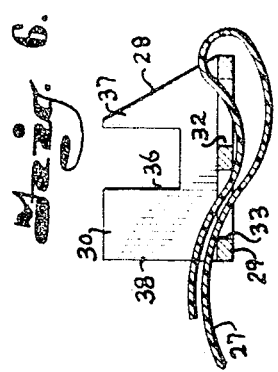
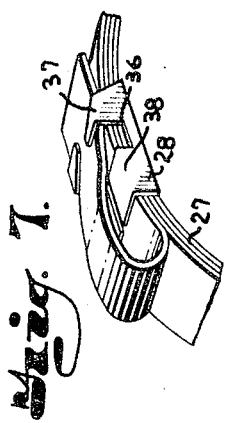
INVENTOR.
DORY J. NEALE, SR.
BY
*Fishburn and Gold*
ATTORNEYS

United States Patent Office 3,464,660
Patented Sept. 2, 1969

3,464,660
TAPE SPLICING AND ANCHORING APPARATUS
Dory J. Neale, Sr., 3710 Shore Acres Blvd.,
St. Petersburg, Fla. 33703
Filed Apr. 10, 1967, Ser. No. 629,544
Int. Cl. F16l *3/00;* E21f *17/02*
U.S. Cl. 248—61                           5 Claims

ABSTRACT OF THE DISCLOSURE

A cable messenger support structure using a plastic tape with anchors or fasteners with tape engaging and clamping parts arranged in cooperative relation to bends and bights of the tape to assure positive securing, certain of the members having slots through which the tape is reeved with reverse bends and clamping ears bent into tape clamping position.

---

Heretofore, it has been common practice in installation of aerial cables to string a messenger or supporting strand between supports such as poles and then to attach an aerial cable near a support and lift the cable whereby it extends along the supporting strand and then lash the cable to the strand by spinning a lashing wire or wires in a spiral formation about the cable or cables and the strand. It has been found that by spinning a flat tape of suitable plastic such as nylon many difficulties experienced with the lashing wire are eliminated. The tape has a substantial area of contact with the cable sheath distributing the lashing force so there is no tendency to indent or cut the sheath as with wire. The tape is substantially inert, long wearing and does not abrade the cable sheath in the event of relative movement that occurs due to wind, change of temperature and the like. While various fittings have been used to anchor or handle the wire lashing and metal straps have been used for supports, such devices are not suitable for use in applying the plastic tape. Also the plastic tape is flexible, substantially nonextensible and tends to return or straighten unless bent double; therefore, it is difficult to secure and maintain in anchored or spliced condition.

The principal objects of the present invention are to provide an aerial cable support system useable for securing one or more cables to a messenger to positively bind them together with the cable shielded against abrading action; to provide an aerial cable support system particularly adapted for use on structures wherein the cables are lashed to the messenger or strand by tape spirally wound therearound with the tape fastened at desired points by anchors or clips, the lashing tape adjacent reverse turns thereof; to provide such a support system which includes a clip adapted to be secured on a supporting strand or messenger and having portions receiving and clamping tape portions with a bight therebetween wherein the tape is secured to the clip to provide such a structure wherein a tape clip has tape receiving slots through which the tape is received to provide a bight therein aiding in securing the tape to the clip, said clip having clamping means engaging said tape adjacent the bight to complete the anchoring of the tape to the clip; to provide an anchorage clip having a pluraliy of tape receiving slots whereby the tape is reeved to provide a double bight and having a plurality of fingers to overlie and clamp the tape portions; to provide such a structure with spaced sets of slots and fingers for splicing or connecting ends of two lengths of tape; to provide an apparatus to apply the tape in a wrapping around the strand, and tension and anchor said tape to provide a cable support; and to provide cable supports which are economical to manufacture, easily installed and efficient in supporting cables to a messenger without danger of injury to the cable or cables.

Other objects and advantages of this invention will become apparent from the following description taken in connection with the accompanying drawings wherein are set forth by way of illustration and example certain embodiments of this invention.

FIG. 1 is a perspective view of a cable lashed to a pole supported messenger or strand and showing a tape support system embodying the features of the present invention.

FIG. 2 is a perspective view of an end anchorage clip tape engaging portion.

FIG. 3 is an elevation of an end anchorage clip in use in a messenger cable clamp with a tape clamped by the tape engaging portion.

FIG. 4 is a perspective view of the application of a tape wrap support for a cable with a tape tightening apparatus.

FIG. 5 is a view of the wrap anchorage and tightener taken on the line 5—5, FIG. 4.

FIG. 6 is a sectional view through the wrap anchorage clip with the tape reeved through slots therein.

FIG. 7 is a partial perspective view of the wrap anchorage clip and tape prior to pulling in final bight therein.

FIG. 8 is a sectional view of a tape splice anchorage clip with the tape reeved through the slots thereof.

FIG. 9 is a perspective view of the one side of the splice anchorage clip with the tape loosely reeved therein.

FIG. 10 is a perspective view of the other side of the splice anchorage clip from that shown in FIG. 9 and with the tape locked therein by the locking fingers.

Referring more in detail to the drawings:

The reference numeral 1 generally designates a messenger or strand suitably mounted on a support such as a pole 2 by a bracket arm and clamp 3 whereby said messenger or strand 1 is spaced outwardly from said pole 2. The pole 2 is an example of the strand supports which are spaced therealong at suitable intervals for properly carrying telephone cables or the like. One or more cables 4 extend along the messenger 1 and are bound or supported therefrom by plastic lashing tape 5 which is applied spirally around the cable or cables 4 and the messenger 1. A suitable tape is a flat tape of nylon and in the nature of ⅜ inch wide.

The length of tape is secured at one end by an anchor 6 which includes V shaped clamp 7 having jaw portions 8 adapted to grip the messenger 1 when drawn together by a tightening member 9. In the illustrated structure the clamp 7 has aligned apertures 10 through which a threaded shank 11 extends with opposed legs of the clamp engaged by a head 12 and nut 13. The member 9 has a threaded shank 14 extending from the head 12 in opposed relation to the shank 11. A tape fastener 15 on the shank 14 includes a clip 16 consisting of a thin metal strip folded or reverse bent as at 17 and having a lateral slot 18 for receiving the shank 14 when placed thereon. There are also a washer 19 between the clip and head 12 and a washer 20 and nut 21 outwardly of the clip. The tape end is inserted between the leaves 22 of the clip adjacent the fold and then the clip is moved onto the shank 14 between the inner and outer washers 19 and 20. The free end 23 of the tape 5 is then inserted between the inside washer 19 and the head 12. The nut 21 on the threaded shank 14 is then tightened providing a clamping engagement between the washer-shaped head 12, the end 23 of the tape 5, the inside washer 19, the end anchorage clip leaves 22 with the tape 5 therein, the outside washer 20. In the illustrated structure the threaded shank 14 has a thickened square shaped portion 24 adjacent to the washer shaped head 12. The portion 24 is complementary the aperture in the adjacent clamp leg to retain the fastener and clamp against relative rotation.

The tape 5 extends from the anchor 6 and is spun around the cable and messenger under tension, said tape being spiralled along the length of the messenger to the next support or pole where the tape end is anchored to the messenger by another anchor assembly 6. At other points or if the tape is cut the ends are anchored by other assemblies 6 at the points to maintain the tape under tension to hold the cable to the messenger.

When a cable is cut and spliced a sleeve 25 is placed over the splice. It is necessary to secure the sleeve to the messenger and this is done by a wrap fastening 26 wherein a tape 27 is wrapped around the messenger 1 and the one or more cables 4. The wrap anchorage 26 includes a clip or member 28 that is channel shaped having a web 29 and substantially parallel flanges 30 and 31. In the illustrated structure the web 29 has a forward slot 32 and a rear slot 33 substantially parallel to each other and transverse to the web 29 and to the tape 27. To start the fastening a free end of the tape 27 is reeved through the slots. It is inserted between the flanges 30 and 31 through the rear slot 33 under the web 29, around the end of the clip 28, again between the flanges 30 and 31, down through the forward slot 32, then up through the rear slot 33, and again between the flanges 30 and 31 with the free end overlying the tape at the rear of the clip. With the tape in position as described the clip 28 is placed on top of the messenger 1 and the tape is wrapped around the cable or cables 4 and over the web 29 passing between the flanges 30 and 31 on each wrap for the desired number of wraps of the tape 27. When the desired number of wraps have been accomplished, the tape 27 is tensioned by a tightening apparatus 35 to be later described. In the illustrated structure the flanges 30 and 31 are each provided with an intermediate slot 36 with the portion forward thereof being a triangular shaped ear 37 and the portion 38 to the rear being rectangular shaped. The ears, however, could be any desired shape. When the tape is sufficiently tightened or tensioned, the rear portions 38 are bent over and engage the tape in a position substantially parallel to the web 29. Tension is then removed from the tape and the tape 27 is bent back over the rear portions 38 in a reverse bight and between the forward ears 37 which are then bent over parallel with the web 29 to clampingly engage the tape 27 thereby securely engaging the wrapping in place on the messenger 1 and one or more cables 4 or on the messenger 1 and a sleeve 25 over a splice in a cable 4.

The tightening apparatus 35 includes an elongate guide plate 39 one end 40 of which bears against and engages the wrap anchorage clip 28 and over which the tape 27 is placed after wrapping around the messenger and one or more cables as previously described. A clamp 41 is slidably mounted on the guide plate 39. The clamp 41 includes an upper plate 42 and a lower plate 43 forming a channel 44 with an opening complementary to and receiving the guide plate 39 for slidably mounting thereon. The plates 42 and 43 are connected by an end portion 45, which also has an ear 46 upstanding above the upper plate 42. Rotatably mounted on the upstanding ear 46 is a knurled drum or cylinder 47 which extends outwardly from the ear 46 over the upper plate 42. The drum 47 is rotated by a handle 48. The drum 47 has a spring 49 urging the handle 48 into a position to engage the drum into the plate 42. The drum 47 is eccentrically mounted on the end ear 46 so as to engage the tape 27 when rotated as later described. The lower plate 43 includes a boss 50 having a threaded base 51. At the end of the elongate plate 39 and opposed to the clip bearing end the tightener 35 has a sleeve member 52 mounted thereon in depending relation. A threaded shank 54 has a portion rotatably mounted in the sleeve member 52 and held against endwise movement by collars 55 and 56 engaging the ends of the sleeve member 52. The shank 54 is threaded in the base 51 and the opposite end of the shank has a turning handle 57. When the tape 27 is wrapped tight and extends between the knurled drum 47 and the upper plate 42, the drum 47 is tightened by rotating the handle 48 to engage the tape 27. The threaded shank 54 is then rotated by the handle 57 so that the clamp 41 moves away from the wrap anchorage clip 28 and pulls the tape 27 tightening same in the wrap around the cable and messenger. When the tape is sufficiently tight the rear portion 28 is bent thereover. The clamp 41 is then released from the tape 27, the tightener removed and the tape bent back and then clamped by bending the ears 27 over to engage same securing the tape against loosening.

When spinning a tape on a cable and messenger the tape 5 is paid from a reel of a spinning machine and it is common for the tape to end somewhere between the poles or supports. It is desirable to continue the spiral wrapping so the end is spliced or fastened relative to an end of tape or another reel and the spinning continued.

Ends 60 and 61 of two lengths of tape 5 are spliced together by use of a splice clip 62. The splice clip 62 is a member formed of thin metal strip having upturned spaced ears 63 and 64 on opposed sides. In the illustrated structure the upstanding ears 63 and 64 are generally triangular shaped with the ears on one side 65 being offset from the ears of the other side 66 so that when folded over each ear is along side of an opposed ear. In the illustrated structure the plate portion 67 of the splice clip 62 has a plurality, preferably, five transverse slots spaced along the length thereof, said slots being 68, 69, 70, 71, and 72, respectively. The slots 63 and 72 are end slots and the slot 70 is the center slot.

One end 60 of a tape 5 to be spliced is inserted down through the end slot 68, back up through the center slot 70, between the ears 63, down through the intermediate slot 69, and back up through the end slot 68 and between the ears 63, thus forming a double bight in the tape. The end of the tape between the upstanding ears 63 is gripped by bending said ears downwardly into tight engagement therewith. The other end piece 61 of the tape to be spliced is applied in the same manner at the other end of the clip 62 and clamped by ears 64.

After completing the clamping of the tape ends, the tape portions are pulled to draw the tape tight to assure a secure splice. The spinning continues.

This tape system assures proper support of the cables to the messenger, eliminates loosening of connections, abrading by relative movement of tape and cable and provides long life as the tape does not corrode or deteriorate.

It is to be understood that while I have illustrated and described one form of my invention, it is not to be limited to the specific form or arrangement of parts herein described and shown except insofar as such limitations are included in the claims.

What I claim and desire to secure by Letters Patent is:
1. In an aerial cable system wherein a supporting messenger strand and cable extend between spaced support structures, support members securing the cable to the messenger strand along the length thereof and including:
   (a) a plastic tape spiraled about the messenger strand and cable under tension to bind same together,
   (b) means engaging an end portion of said tape for retaining same relative to the strand and cable,
   (c) a splice clip engaging the other end portion of said tape and having an elongate portion with side edges,
   (d) said splice clip having a plurality of transverse slots in said elongate portion and spaced longitudinally therein,
   (e) said other end portion of the tape being reeved through said slots reversely bent about adjacent portions of said clip to form a bight in said tape,
   (f) fingers on opposite side edges of the elongate portion and bent into overlying relation to the tape end to clamp same to the elongate portion and anchor the tape thereto.

2. A cable support structure as set forth in claim 1 wherein the plastic tape is a wide flat strip of flexible nylon that is substantially nonextensible.

3. A cable support structure as set forth in claim 1 wherein the tape is reeved through certain slots and reversely bent about an adjacent portion of the clip and is then reeved through at least two slots and again reversely bent to form a plurality of bights in the tape.

4. A cable support structure as set forth in claim 3 wherein the clip has the transverse slots arranged in corresponding groups with the end portion of one tape reeved through groups of slots adjacent one end and an end portion of another tape reeved through the group of slots at the other end with fingers on the sides for the respective groups of slots bent over the respective tape ends to secure the tapes relative to said clips and thereby splice the tapes together.

5. An aerial cable system, in combination;
(a) a supporting messenger strand and cable extending between spaced support structures with a wrap fastener securing a portion of the cable to the messenger strand,
(b) an elongate plastic tape that is a wide flat strip of flexible nylon and substantially nonextensible,
(c) a clip having an elongate portion provided with spaced transverse slots with an end portion of said plastic tape reeved through one slot around the end and through another slot and then back through the first slot,
(d) side members on the elongate portion and having spaced fingers on each side in opposed relation,
(e) said clip resting on the messenger strand with the tape extending from the clip and wrapped about the cable and strand under tension and between the side members in a plurality of turns,
(f) certain opposed fingers being bent in overlying clamping relation to the last turn of the tape with the tape reversely bent to extend in overlying relation to said certain opposed fingers, the other opposed fingers being bent in overlying relation to the end of the tape to clamp same and maintain the tension thereon.

References Cited

UNITED STATES PATENTS

| | | | |
|---|---|---|---|
| 1,226,876 | 5/1917 | Furth | 24—23 |
| 1,786,107 | 12/1930 | Du Vulitch | 81—9.3 X |
| 2,377,224 | 6/1945 | Gerrard | 24—23 |
| 2,419,364 | 4/1947 | Montgomery | 248—61 |
| 2,509,422 | 5/1950 | Clapp | 248—61 |
| 2,744,707 | 5/1956 | Peterson | 248—61 |
| 2,816,337 | 12/1957 | Gerrard | 24—23 |
| 3,171,889 | 3/1965 | McCarthy | 248—74 X |
| 3,173,638 | 3/1965 | Neale | 248—74 X |
| 779,279 | 1/1905 | Hastings | 24—22 X |
| 2,441,930 | 5/1948 | Churchill | 24—265 X |

FOREIGN PATENTS 544,278   4/1942   Great Britain.

CHANCELLOR E. HARRIS, Primary Examiner

U.S. Cl. X.R.

24—68, 23; 81—9.3